(12) United States Patent
Laroia et al.

(10) Patent No.: US 9,426,013 B2
(45) Date of Patent: *Aug. 23, 2016

(54) OFDM COMMUNICATIONS METHODS AND APPARATUS

(71) Applicant: QUALCOMM Incorporated, San Diego, CA (US)

(72) Inventors: Rajiv Laroia, Far Hills, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/278,405

(22) Filed: May 15, 2014

(65) Prior Publication Data

US 2014/0247898 A1 Sep. 4, 2014

Related U.S. Application Data

(63) Continuation of application No. 09/931,469, filed on Aug. 16, 2001, now Pat. No. 9,130,810, and a continuation-in-part of application No. 09/805,887, filed on Mar. 15, 2001, now Pat. No. 7,295,509.

(60) Provisional application No. 60/230,937, filed on Sep. 13, 2000.

(51) Int. Cl.
*H04L 27/26* (2006.01)
*H04L 5/00* (2006.01)
*H04L 5/02* (2006.01)

(52) U.S. Cl.
CPC .......... *H04L 27/2626* (2013.01); *H04L 5/0012* (2013.01); *H04L 5/0039* (2013.01);
(Continued)

(58) Field of Classification Search
CPC ..... H04L 5/023; H04L 5/0012; H04L 5/0041; H04L 5/0038; H04L 5/0039; H04L 27/2626; H04L 27/2602; H04L 27/2647; H04L 27/2605; H04L 27/2614; H04L 27/2643; H04L 5/0048
See application file for complete search history.

(56) References Cited

U.S. PATENT DOCUMENTS 5,553,069 A   9/1996 Ueno et al.
5,790,516 A * 8/1998 Gudmundson ..... H04L 27/2602
                                                          370/210
(Continued)

FOREIGN PATENT DOCUMENTS

EP   0872068 A1   10/1998
EP   1172983 A2    1/2002
(Continued)

OTHER PUBLICATIONS

Frescura et al., "DSP Based OFDM Demodulator and Equalizer for Professional DVB-T Receivers," IEEE Transactions on Broadcasting, Sep. 1999, pp. 323-332, vol. 45, No. 3, IEEE Service Center, Piscataway, NJ, USA, XP011083078, ISSN: 0018-9316.
(Continued)

*Primary Examiner* — Jianye Wu
(74) *Attorney, Agent, or Firm* — Dalei Dong

(57) ABSTRACT

OFDM signal communication methods and apparatus are described. In accordance with the invention OFDM signals are generated in the time domain with symbols being mapped to specific points in time. Training symbols may be included in the transmitted OFDM signal to facilitate symbol recovery. An exemplary receiver of the invention receives the OFDM signal from the communications channel, converts it into the frequency domain, and then filters it in the frequency domain to eliminate tones corresponding to other users. The filtered signal free of MAC interference is then converted into the time domain where channel estimation and compensation operations are performed. After channel compensation symbol recovery is performed in the time domain.

26 Claims, 6 Drawing Sheets

(52) U.S. Cl.
CPC ............ *H04L5/0041* (2013.01); *H04L 5/0048* (2013.01); *H04L 5/023* (2013.01); *H04L 27/2602* (2013.01); *H04L 27/2605* (2013.01); *H04L 27/2614* (2013.01); *H04L 27/2643* (2013.01); *H04L 27/2647* (2013.01)

(56) References Cited

U.S. PATENT DOCUMENTS

| | | | |
|---|---|---|---|
| 7,010,048 B1* | 3/2006 | Shattil | H04B 1/7174 375/130 |
| 7,450,532 B2 | 11/2008 | Chae et al. | |
| 2002/0044524 A1 | 4/2002 | Laroia et al. | |
| 2004/0240572 A1 | 12/2004 | Brutel et al. | |
| 2004/0264593 A1 | 12/2004 | Shim et al. | |
| 2006/0089104 A1 | 4/2006 | Kaikkonen et al. | |
| 2006/0107171 A1 | 5/2006 | Skraparlis | |
| 2006/0233222 A1 | 10/2006 | Reial et al. | |
| 2009/0129501 A1 | 5/2009 | Mehta et al. | |
| 2014/0376518 A1 | 12/2014 | Palanki et al. | |

FOREIGN PATENT DOCUMENTS

| | | |
|---|---|---|
| JP | H0746248 A | 2/1995 |
| JP | 2000022618 A | 1/2000 |
| JP | 2002111556 A | 4/2002 |
| JP | 2002538696 A | 11/2002 |
| JP | 2003235072 A | 8/2003 |
| JP | 2003536308 A | 12/2003 |
| JP | 2004507151 A | 3/2004 |
| JP | 2005110130 A | 4/2005 |
| JP | 2006524930 A | 11/2006 |
| WO | 9965155 A1 | 12/1999 |
| WO | 0051389 A1 | 8/2000 |
| WO | 0195427 A2 | 12/2001 |
| WO | 0215432 A1 | 2/2002 |
| WO | 2005055465 A1 | 6/2005 |

OTHER PUBLICATIONS

Steiner B., "Performance aspects of an MC/JD-CDMA mobile radio system employing non-contiguous frequency bands", IEEE, 49th Vehicular Technology Conference, Houston, TX, USA May 16-20, 1999, Piscataway, NJ, USA, IEEE, US, vol. 1, May 16, 1999, pp. 30-34, XP010342028, DOI: 10.1109/VETEC.1999.778010, ISBN: 978-0-7803-5565-1, I. Introduction, II. System model, III.A. Test Symbol Based Approach, IV. Simulation results, figures 1,2.

Tufvesson F., et al., "Pilot Assisted Channel Estimation for OFDM in Mobile Cellular Systems," IEEE 47th Vehicular Technology Conference, Phoenix, May 4-7, 1997, IEEE Vehicular Technology Conference, NY, IEEE, US vol. 3, Conference 47,XP010229045, pp. 1639-1643.

Van De Beek J.J., et al., "Synchronization of a TDMA-OFDM frequency hopping system", Vehicular Technology Conference, 1998, VTC 98, 48th IEEE Ottawa, Ontario, Canada May 18-21, 1998, New York, NY, USA, IEEE, US, vol. 2, May 18, 1998, pp. 1290-1294, XP010287974, DOI: 10.1109/VETEC.1998.686447, ISBN: 978-0-7803-4320-7.

Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.

Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.

Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

European Search Report—EP14178034—Search Authority—Munich—Jun. 5, 2015.

* cited by examiner

OFDM COMMUNICATIONS METHODS AND APPARATUS

CROSS REFERENCES

The present application is a continuation application of U.S. patent application Ser. No. 09/931,469, filed on Aug. 16, 2001, entitled "OFDM COMMUNICATIONS METHODS AND APPARATUS," which is a continuation-in-part of U.S. patent application Ser. No. 09/805,887, filed on Mar. 15, 2001, entitled "SIGNALING METHOD IN AN OFDM MULTIPLE ACCESS SYSTEM," and which claims the benefit to U.S. Provisional Patent Application No. 60/230,937, filed on Sep. 13, 2000, entitled "SIGNALING METHOD IN AN OFDM MULTIPLE ACCESS WIRELESS SYSTEM," the entireties of which are incorporated herein by reference.

TECHNICAL FIELD

This invention relates to orthogonal frequency division multiplexing (OFDM) communication systems, and more particularly to methods and apparatus for implementing OFDM transmitters and receivers suitable for use in, e.g., a multiple access communication network.

BACKGROUND

Orthogonal frequency division multiplexing (OFDM) is a relatively well known multiplexing technique for communication systems. OFDM communication systems can be used to provide multiple access communication, where different users are allocated different orthogonal tones within a frequency bandwidth to transmit data at the same time. In an OFDM communication system, the entire bandwidth allocated to the system is divided into orthogonal tones. In particular, for a given symbol duration T available for user data transmission, and a given bandwidth W, the number of available orthogonal tones F is given by WT. The spacing between the orthogonal tones $\Delta$ is chosen to be 1/T, thereby making the tones orthogonal. In addition to the symbol duration T which is available for user data transmission, an additional period of time Tc can be used for transmission of a cyclic prefix. The cyclic prefix is prepended to each symbol duration T and is used to compensate for the dispersion introduced by the channel response and by the pulse shaping filter used at the transmitter. Thus, although a total symbol duration of T+Tc is employed for transmitting an OFDM symbol, only the symbol duration T is available for user data transmission and is therefore called an OFDM symbol duration.

In prior OFDM techniques, an OFDM signal is first constructed by a transmitter in the frequency domain by mapping symbols of a constellation to prescribed frequency tones. The signal constructed in the frequency domain is then transformed to the time domain by an inverse discrete Fourier transform (IDFT) or inverse fast Fourier transform (IFFT). A cyclic prefix having duration Tc, as discussed above, is then prepended to the time domain signal corresponding to each symbol duration T resulting in a signal which has the total symbol duration T+Tc for each symbol to be transmitted. The time domain signal including the cyclic prefixes is sampled to obtain the digital signal samples to be transmitted.

In general, symbols of the constellation have a relatively low peak to average ratio property. For example, symbols of a QPSK constellation all have the same amplitude.

However, after being transformed by the IDFT or IFFT, the resultant time domain signal samples are the weighted sum of all the symbols, and therefore generally do not preserve the desirable low peak to average ratio property. In particular, the resulting time domain signal typically has a high peak to average ratio.

Since symbols are mapped to tones in known OFDM transmitters in the frequency domain, symbol recovery is also performed in the frequency domain, e.g., with received signals corresponding to individual tones being mapped back in the frequency domain to individual symbols.

FIG. 1 illustrates an exemplary known OFDM receiver 100. The OFDM receiver 100 includes an antenna 102, tuner 104, A/D converter 106, cyclic prefix discarding circuit 108, FFT circuit 110, training symbol extraction circuit 112, a frequency domain channel estimation circuit 114, a frequency domain channel equalization circuit 118 and decoder 118 coupled together as illustrated in FIG. 1.

Broadcast OFDM signals are received via antenna 102 and then filtered by tuner 104 which outputs a signal which includes the OFDM tones used to transmit symbols. The continuous signal output by the tuner 104 is sampled by A/D converter 106 to generate a digital signal which is then processed by the cyclic prefix discarding circuit 108. Circuit 108 discards the portion Tc of the received signal corresponding to the cyclic prefix. The remaining portion of the signal corresponding to the symbol duration T is supplied to the transform circuit 110, e.g., an FFT or DCT circuit, which converts the time domain signal representing the transmitted symbols into the frequency domain. Training symbol extractor 112 extracts one or more training symbols or pilot tones, i.e., symbols or tones with known transmitted values in the frequency domain, from the received signal. The extracted training symbols/tones are supplied to the frequency domain channel estimation circuit 114. The circuit 114 estimates the effect, in the frequency domain, of the communications channel on the transmitted signals as evidenced by the difference between the between the received training symbol(s) or pilot tone(s) and the expect values. Frequency domain channel equalization circuit 116 receives channel estimation information from circuit 114 and performs channel equalization operations on the frequency domain signal generated by transform circuit 110 to compensate for channel distortions. After channel equalization is performed in the frequency domain, the signal is processed by decoder 118 which maps the frequency domain signal into symbols and/or data.

Existing techniques for implementing OFDM communication systems can be highly inefficient in terms of power utilization due to the relatively high peak to average ratio when compared with other signaling schemes, such as single carrier modulation schemes. As a result, existing OFDM techniques are not well suited for a wireless multiple access communication network with highly mobile users because the high peak to average ratio of the transmitted signal requires a large amount of power at the base station and at the wireless device. The large power requirements result in short battery life and more expensive power amplifiers for handheld wireless communication devices or terminals. Accordingly, it is desirable to provide an OFDM technique which reduces the peak to average ratio of the signal to be transmitted, while simultaneously taking advantage of the larger communication bandwidth offered by an OFDM communication system.

SUMMARY

The present invention is directed to OFDM communications systems wherein data symbols are generated, e.g., modulated, and recovered in the time domain as opposed to the frequency domain.

The transmitter of the present invention modulates data symbols in the time domain to a prescribed set of time instants corresponding to a symbol duration. The mapped symbols are smoothly connected to form the transmitted OFDM signal such that the generated signal corresponding to a user includes only frequency components at the tones allocated to that particular user. The time domain OFDM signaling method of the present invention has the advantage over the known frequency domain OFDM signaling method in that it can, in many cases, provide a substantially lower peak-to-average ratio.

In various embodiments, the time-domain OFDM signaling method of the present invention is used to implement a multiple access communication (MAC) system. In the MAC embodiment, different users are allocated different sets of tones for use during the same OFDM symbol period. In the multiple access system, the transmitted signals from different transmitters, each using a set of tones allocated to a different user, are often mixed in the communications channel prior to arriving at an individual user's receiver. In such a case, the signals of other users are multiple access interference to the signal of the individual user trying to recover the data which was communicated on the user's allocated tones.

In accordance with one exemplary receiver embodiment of the present invention, in order to eliminate multiple access interference the receiver first samples the received signal, discards samples corresponding to transmitted cyclic prefixes, and then transforms the remaining signal from the time domain to the frequency domain, e.g., by performing an FFT operation. After the signal has been converted into the frequency domain, the signal is filtered to remove tones of other users. This results in a signal including the tones allocated to the user of the receiver but not other users.

After removal of the tones of other users from the signal, the signal is converted back into the time domain to facilitate recovery of the transmitted symbols. The transformation to the time domain can be implemented by, e.g., performing an Inverse Discrete Fourier Transform (IDFT) operation on the filtered signal.

Time domain channel estimation and equalization techniques are then used to reduce and/or eliminate signal distortions introduced by the communications channel.

In order to facilitate channel estimation and equalization operations, training symbols are included in the transmitted OFDM signal by the transmitter of the present invention along with the symbols used to convey the user's data. The training symbols are known by the receiver prior to their receipt allowing the receiver to estimate the distortions introduced by the channel by comparing the received training symbol values to their known expected values.

In one exemplary embodiment of the invention, during each OFDM symbol period, one or more training symbols are transmitted to a user's device along with data symbols used to convey the user's data. The training symbols are used as discussed above, during time domain signal processing, to estimate the response of the communication channel. The resulting channel estimate is then used in a channel equalization operation to facilitate the recovery of the transmitted data symbols.

In one particular exemplary embodiment, users in a MAC system of the present invention are allocated a set of tones to be used for a time period called a dwell. The dwell corresponds to a number of successive symbol transmission periods. In accordance with one such embodiment, the tones allocated to a user during each successive symbol period of a dwell remain the same. In that particular exemplary embodiment, training symbols are transmitted during some, e.g., one, but not all of the symbol periods in each dwell. The period or periods in which training symbols are transmitted are called training symbol periods. In one such embodiment, a symbol period at or near the center of the dwell is used for transmitting training symbols while data symbols are transmitted during the other symbol periods of each dwell. In accordance with such embodiments where training symbols are not transmitted during all the symbol periods, the channel estimates generated from training symbols received during a training symbol period of a dwell are used during the other symbol periods of the same dwell for channel equalization purposes.

Additional features, elements, and embodiments of the communications system of the present invention will be discussed in detail below.

DETAILED DESCRIPTION

Figure 2:
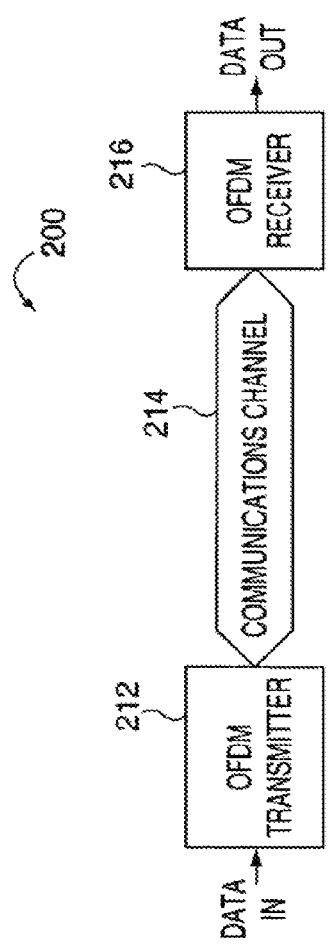
FIG. 2 is a diagram of an OFDM communications system implemented in accordance with the present invention.

FIG. 2 illustrates a communications system 200 implemented in accordance with the present invention. The system 200 includes an OFDM transmitter 212 and an OFDM receiver 216 coupled together by a communications channel 214. The OFDM transmitter 212 and OFDM receiver 216 are implemented in accordance with the present invention as will be discussed in detail below. The communications channel 214 may be, e.g., the air in a wireless communications embodiment. The communications channel 214 may introduce into the transmitted signal a wide range of distortions including, e.g., noise, multi-path distortions, etc. In addition, signals transmitted to/from multiple users of the OFDM system 200 may become mixed in the communications channel 214. As a result of being sent through the communications channel 214 the signal received by the OFDM receiver 216 may be different from the signal transmitted by the OFDM transmitter 212. As will be discussed below, the receiver 216 performs one or more channel compensation operations, in accordance with various features of the invention, to compensate for, and/or reduce, the effect of signal distortions introduced by the communications channel 214.

In the traditional OFDM transmission method discussed above, an OFDM signal is formed by modulating symbols to frequency tones, respectively, where the symbols represent the user information to be transmitted and where the symbols are selected from some signal constellation. This traditional method of generating an OFDM signal is referred to herein as frequency-domain OFDM signaling since signal creation is performed primarily in the frequency domain.

In accordance with one feature of the transmitter of the present invention, an OFDM signal is created in the time domain as opposed to the frequency domain. Accordingly, the technique of the present invention is referred to as time-domain OFDM signaling. In time domain OFDM signaling data symbols are modulated in the time domain to a prescribed set of time instants, e.g., uniformly spaced instants within a symbol period T. The mapped symbols are then smoothly connected to form a continuous signal, e.g., the OFDM signal to be transmitted during all or a portion of a symbol period T. The process is repeated for each symbol period. The techniques of the present invention used to create the continuous signal to be transmitted from the discrete points mapped in the time domain during each symbol period T are such that the generated signal will include only frequency components at the OFDM signal tones designated for communicating the symbols.

An exemplary transmitter of the present invention and exemplary time domain OFDM signal generation technique of the invention will now be discussed with reference to FIGS. 3-6. Additional techniques and circuits for generating OFDM signals in the time domain in accordance with the invention are discussed in detail in U.S. patent application Ser. No. 09/805,887 which is incorporated herein by reference.

Figure 3:
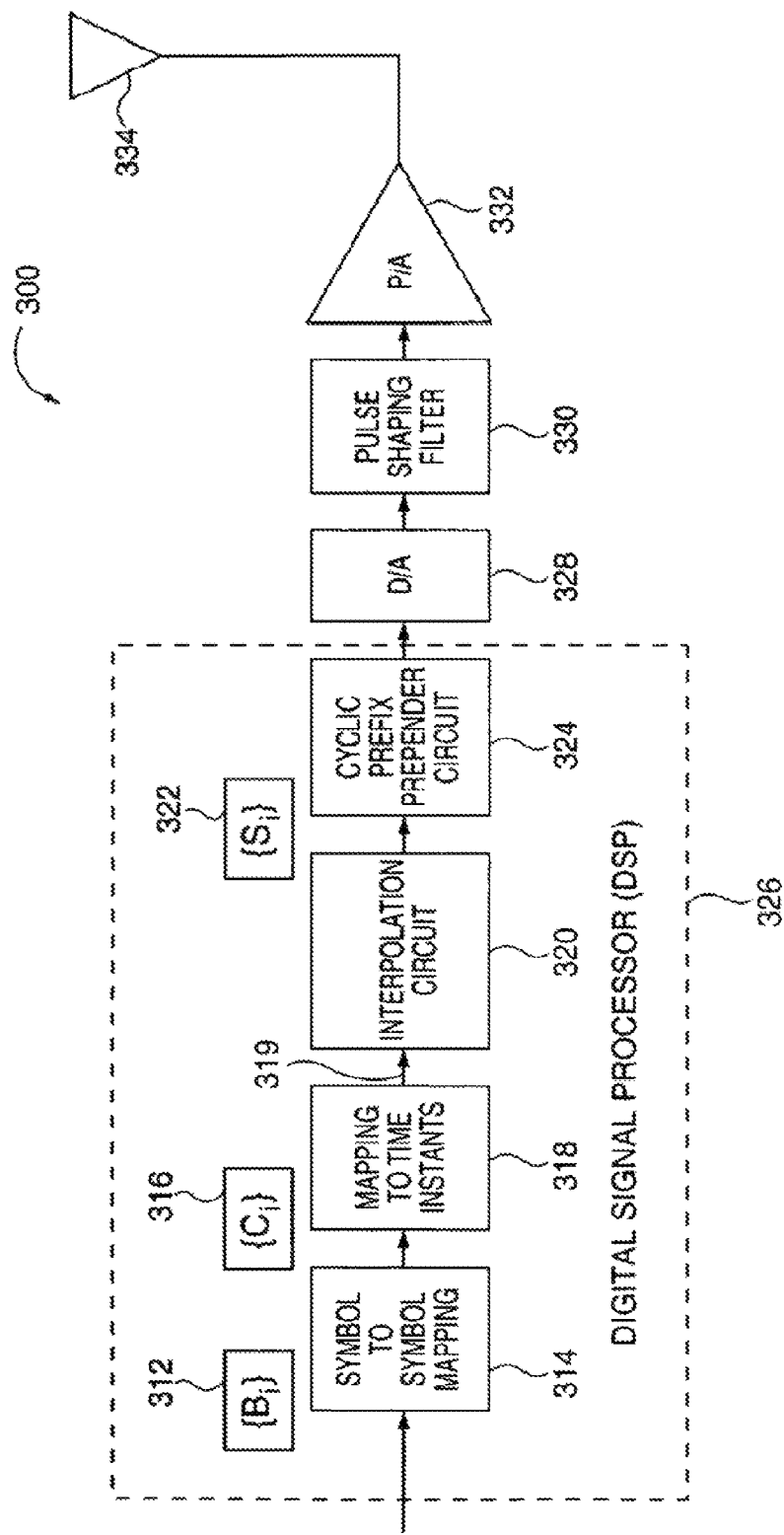
FIG. 3 is a block diagram of a transmitter implemented in accordance with the invention.

Referring now to FIG. 3, an orthogonal frequency division multiplexing (ODFM) transmitter 210 is shown. OFDM transmitter 210 receives a first constellation of symbols $\{B_i\}$ 312 and provides the symbols to a symbol to symbol mapping circuit 314, that produces a second constellation of complex symbols $\{C_i\}$ 316. The complex symbols 316 represent data or a stream of data to be transmitted by the OFDM communication system, and may be chosen from a variety of symbol constellations including, but not limited to phase shift keying (PSK) and quadrature amplitude modulation (QAM) symbol constellations. The symbol to symbol mapping performed by the mapping circuit 314 is an optional step performed by the OFDM transmitter 210.

Next, a time instant mapping circuit 318 maps each complex symbol 316 to a prescribed time instant within a given OFDM symbol duration. The mapping operation is performed in the time domain such that the mapping circuit 318 generates a discrete signal of mapped symbols within the time domain symbol duration. The output of the mapping circuit 318 is provided to an interpolation circuit 320, that produces a series of digital signal samples $\{S_i\}$ 22. The digital signal samples 322 are formed by sampling a continuous signal, which is constructed by applying one or more predetermined continuous interpolation functions to the mapped complex symbols 319. Alternatively, the digital signal samples 322 are formed by directly applying one or more predetermined discrete interpolation functions to the mapped complex symbols 319. When using the technique of applying discrete interpolation functions, no intermediate continuous signal is generated and the step of sampling the continuous signal is not necessary. The operation of the interpolation circuit 320 is described in greater detail below. A cyclic prefix circuit 324 receives the series of digital signal samples 322 from the interpolation circuit 320 and prepends a cyclic prefix to the digital signal samples 322. The cyclic prefix circuit 324 operates to copy and prepend the last portion of the digital signal sample vector S 322 to the beginning of the OFDM symbol duration. The resulting digital signal samples 322 with the prepended cyclic prefix are converted to an analog signal by a digital to analog converter 328. The resulting analog signal is further processed by a pulse shaping filter 330, the output of which is modulated to a carrier frequency, and amplified by a power amplifier unit 332 for transmission through an antenna 34.

Figure 4:
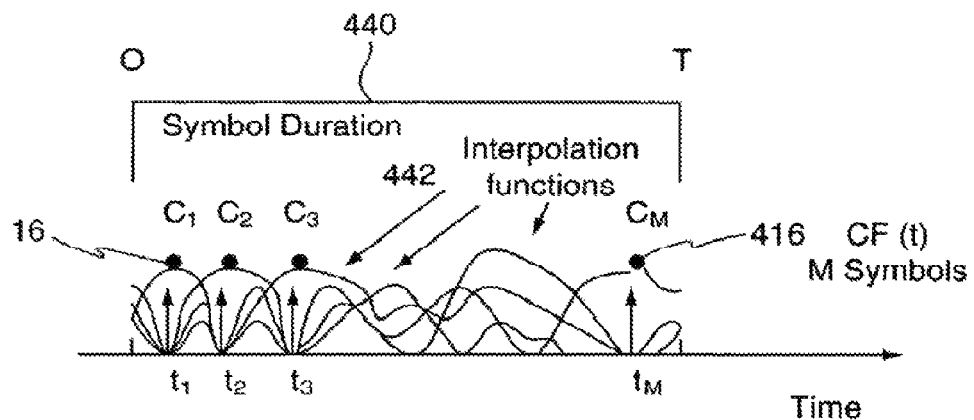
FIG. 4 is a graph showing symbols mapped to prescribed time instants in the time domain according to the OFDM transmission technique implemented by the transmitter of FIG. 3.

FIG. 4 graphically depicts the signal processing steps performed by the various circuits of the DSP 26 in one exemplary embodiment. More specifically, FIG. 4 shows the construction of the signal to be transmitted in a given OFDM time domain symbol duration 440. The time domain symbol duration 440 is a time interval from 0 to T. For purposes of the following description, the OFDM symbol duration T does not include the cyclic prefix. The signal to be transmitted in the symbol duration 440 is represented by complex symbols $C_1, C_2, C_3, \ldots, C_M$ 16 that are mapped to the prescribed time instants, where M denotes the number of symbols to be transmitted in the symbol duration 440.

In one implementation, the OFDM transmitter 210 is a multiple access communication system where the entire bandwidth available to the users of the system is divided into F orthogonal frequency tones, $f_1, f_2, \ldots, f_F$. In the given symbol duration 440, a user within the multiple access communication system is allocated M frequency tones $f_{i(1)}, f_{i(2)}, \ldots, f_{i(m)}$, which is a subset of $f_1, f_2, \ldots, f_F$ (the total number of frequency tones) in order to transmit a signal, e.g., a signal representing M symbols. The remaining frequency tones can be used by other users of the transmitter 210 or other transmitters which form party of a communications system. This technique allows OFDM transmitter 210 to operate as part of a multiple access communication system.

For a given user, the transmitter 210 first maps the complex data symbols $C_1, C_2, C_3, \ldots, C_M$ 416 to $t_1, t_2, t_3, \ldots, t_m$, respectively, where $t_1, t_2, t_3, \ldots, t_m$ are M prescribed time instants within the time domain symbol duration 440. The mapping operation generates a discrete signal of mapped symbols. It should be noted that the number of prescribed time instants is equal to the number of symbols M to be transmitted. As described above, the symbol mapping occurs in the time domain. Continuous interpolation functions 442 are then applied to the discrete signal of mapped symbols 416 to generate a continuous function CF(t) for t in the time interval from 0 to T.

The interpolation functions 442 are constructed such that the values of the continuous function CF(t) at time instants $t_1, t_2, t_3, \ldots, t_M$ are respectively equal to $C_1, C_2, C_3, \ldots, C_M$ and the frequency response of the continuous function CF(t) contains only sinusoids at the allocated tones. Therefore, CF(t) is constructed as $$CF(t) = \sum_{k=1}^{M} A_k e^{j2\pi f_{i(k)} t}$$

where $J=\sqrt{-1}$ and coefficients $A_k$ are given by $$\begin{bmatrix} A_1 \\ \vdots \\ A_M \end{bmatrix} = \begin{bmatrix} e^{j2\pi f_{i(1)} t_1} & \cdots & e^{j2\pi f_{i(M)} t_1} \\ \vdots & & \vdots \\ e^{j2\pi f_{i(1)} t_M} & \cdots & e^{j2\pi f_{i(M)} t_M} \end{bmatrix}^{-1} \begin{bmatrix} C_1 \\ \vdots \\ C_M \end{bmatrix}$$

Thus, each time domain signal coefficient $A_k$ is generated by multiplying a matrix of predetermined sinusoids with the single column of data symbols $C_1, C_2, C_3, \ldots, C_M$ 416.

Figure 5:
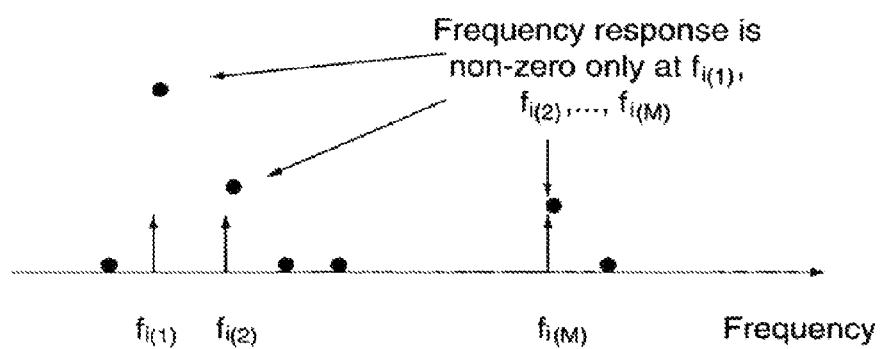
FIG. 5 is a graph showing the frequency domain response of the graph of FIG. 4.

FIG. 5 shows the frequency response of the continuous function CF(t), which is the composite of the M interpolated signals shown in FIG. 4. More specifically, FIG. 5 shows that, in accordance with the present invention, the frequency response of the continuous function is non-zero only at the M frequency tones $f_{i(1)}, f_{i(2)}, \ldots, f_{i(m)}$ allocated to the particular user, and is zero at all other frequency tones.

Preferably, the tones in the transmitted OFDM signal allocated to an individual user will be equally spaced in the frequency domain and, optionally, contiguous tones in the overall set of tones that are used in the system 200. At the receiver, tones corresponding to other users may be interspaced with the tones allocated to a particular user due to mixing in the communications channel 214.

Thus, in a multi-user system, the transmitted signal corresponding to a single user may suffer interference from signals (tones), corresponding to other users. In addition, in the communication channel, the transmitted signal may interact with signals from other communications systems, reflections of the transmitted signal and noise sources. This results in distortions in the received signal. Thus, both in the frequency and time domains a received signal will be different from the signal which was transmitted.

Figure 6:
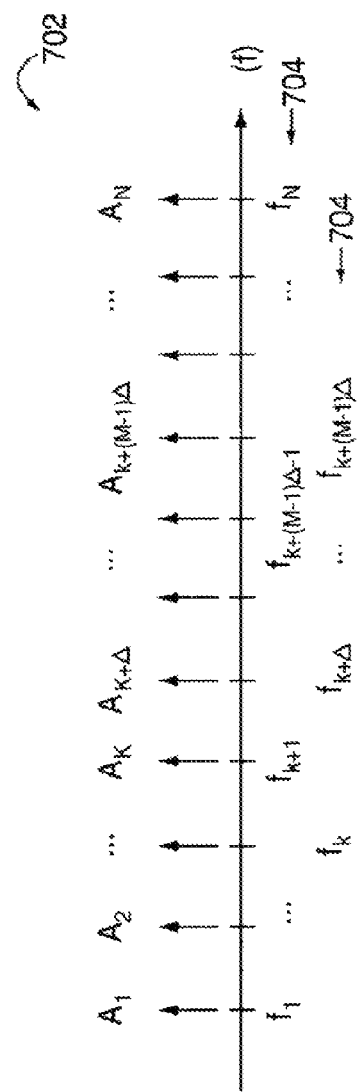
FIG. 6 is a graph showing the tones allocated to a plurality of users of the communications system shown in FIG. 2.

Reference numeral 702 is used in FIG. 6 to refer to a diagram illustrating the N tones transmitted by a plurality of system users during a single exemplary OFDM symbol duration. Reference number 704 is used to identify the set of M tones assigned to the exemplary user. The remaining N-M tones are used by other users. In the FIG. 6 example, Δ is greater than the minimum tone spacing resulting in tones $f_{k+1}$ and $f_{[k+(M-1)\Delta]-1}$ being interspaced with the tones 704 used by the exemplary user.

Symbols are mapped by the transmitter in the time domain in accordance with the present invention and are similarly recovered by the receiver 216 in the time domain. However, to remove distortions in a user's transmitted symbols created by tones used by other system users, received signals are first filtered in the frequency domain to reduce and/or eliminate the effect of tones assigned to other users before attempting to recover a user's transmitted symbols in the time domain.

While filtering in the frequency domain can eliminate the effect of other user's tones, channel distortions remain a problem to time domain symbol recovery. While traditional OFDM channel compensation techniques focus on channel compensation being performed in the frequency domain, such conventional channel compensation techniques can prove unsuitable for recovery of symbols which were initially generated in the time domain and are to be recovered in the time domain.

In accordance with one feature of the present invention, in contrast to known OFDM systems, channel compensation is performed in the time domain as opposed to the frequency domain. In order to facilitate such channel compensation, known symbol values, sometimes call training symbols, are transmitted along with data symbols. By comparing the expected training symbol time domain signal values to received time domain signal values, the effect of the communications channel on the user's transmitted signal can be estimated and then corrected for, e.g., in a channel equalization operation. Alternatively, the training symbols in the time domain can be used to train the equalizer directly without the first step of channel estimation.

Figure 7:
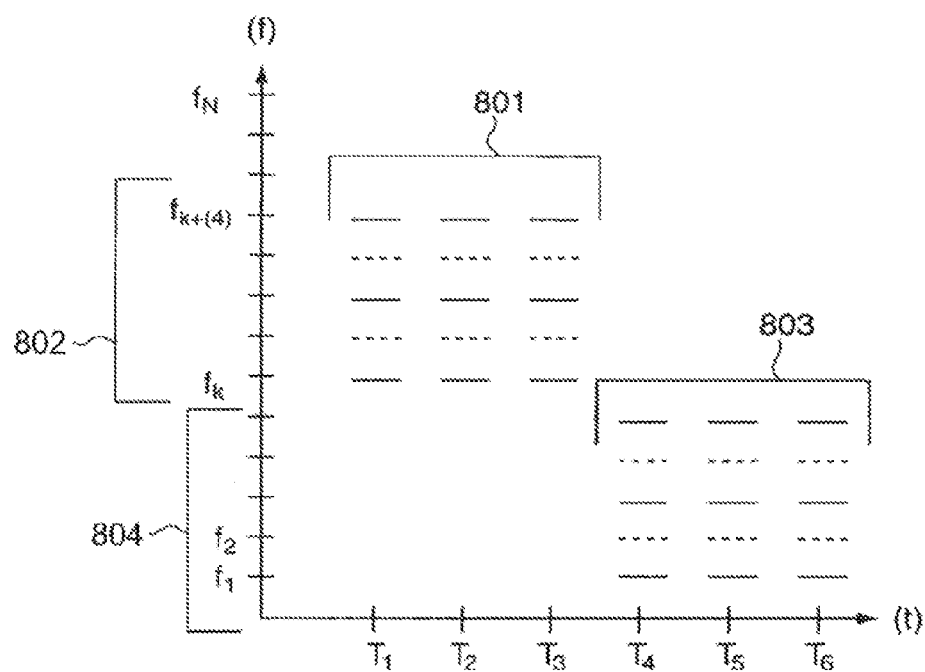
FIGS. 7 and 8 illustrate different techniques for transmitting training symbols in accordance with various embodiments of the present invention.
Figure 8:
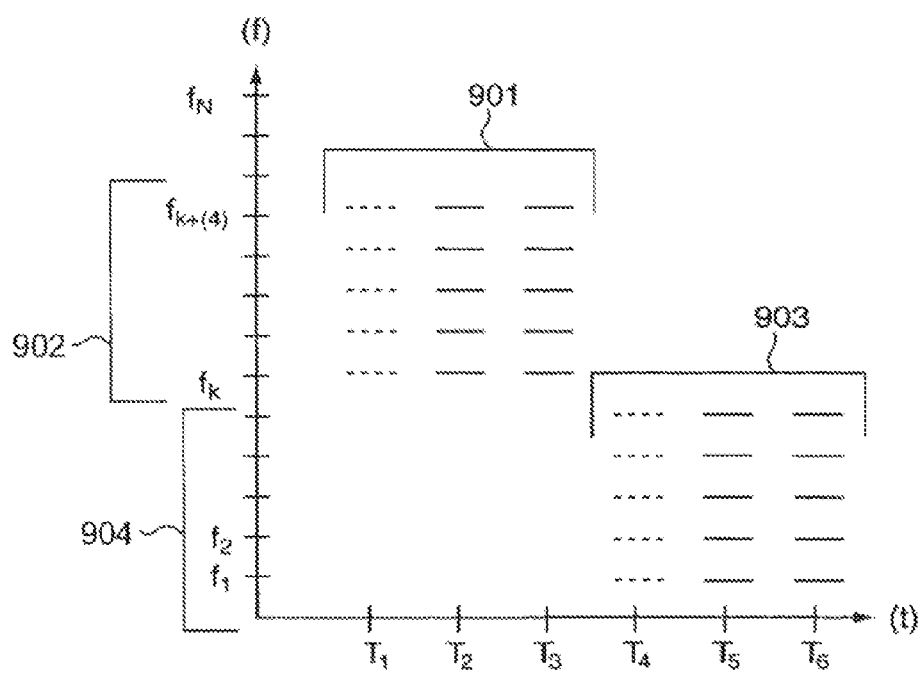

FIGS. 7 and 8 illustrate two alternative techniques for transmitting training symbols in accordance with the present invention. In the FIGS. 7 and 8 examples an exemplary user is allocated a set of M tones from a plurality of N total tones. In the examples M=5. After a preselected number of symbol transmission periods, 3 in the FIGS. 7 and 8 examples, the user is allocated a new set of M tones to be used for transmission purposes. The time period in which a user is allocated a fixed set of tones is referred to as the dwell. In each of FIGS. 7 and 8 two dwell periods are illustrated (801, 803) and (901, 903).

In the FIG. 7 example during dwell 801, the user is allocated a first set of tones 802 to be used. During the second dwell 803, the second set of tones 804 is used. During each symbol duration T in the dwell 802 two training symbols are transmitted and 3 data symbols. The tones corresponding to the transmitted training symbols are shown in FIGS. 7 and 8 using dashed lines while tones corresponding to data symbols are shown using solid lines.

The continuous transmitted signal is created in the time domain by treating the training symbols as two of the symbols to be transmitted and then generating a continuous signal from the training symbols and data symbols to be transmitted during a symbol period in accordance with the present invention.

Transmission of the two training symbols in the FIG. 7 example results in the inability to use the bandwidth corresponding to some, i.e., two, tones for the transmission of data during each symbol duration of the dwell 801, 803. However, it provides channel compensation information to the receiver during each symbol period.

In cases where a dwell corresponds to multiple symbol periods, efficiency in terms of communication bandwidth can be achieved in accordance with one feature of the invention by transmitting training symbols during a subset of the symbol transmission periods which exist within a dwell. All or only some of the tones allocated to a user may be used for transmission of the training symbols during the symbol period or periods of the dwell during which training symbols are transmitted. Channel information derived from the training symbols received during one symbol period are then used during those symbol periods of the same dwell in which no training symbols are received for channel compensation purposes. This channel compensation technique is particularly well suited where changes in channel conditions are likely to be small throughout the dwell period which is the case in many practical embodiments.

FIG. 8 illustrates an example where all the tones in one symbol transmission period of a dwell are used to communicate training symbols. The tones during the other symbol transmission periods of each dwell are used to transmit data. In one particular embodiment, the symbol period during which the training symbols are transmitted is located in the middle of the dwell. Note that in the FIG. 7 example ⅔ of the bandwidth (tones) allocated to a user is used during each dwell to communicate training symbols while in the FIG. 8 example only ⅓ of the bandwidth is used for the transmission of training symbols. In implementations where dwells include a relatively large number of symbol transmission periods, even greater efficiency can be achieved by using the FIG. 8 approach to transmitting training symbols as opposed to the FIG. 7 technique.

Figure 1:
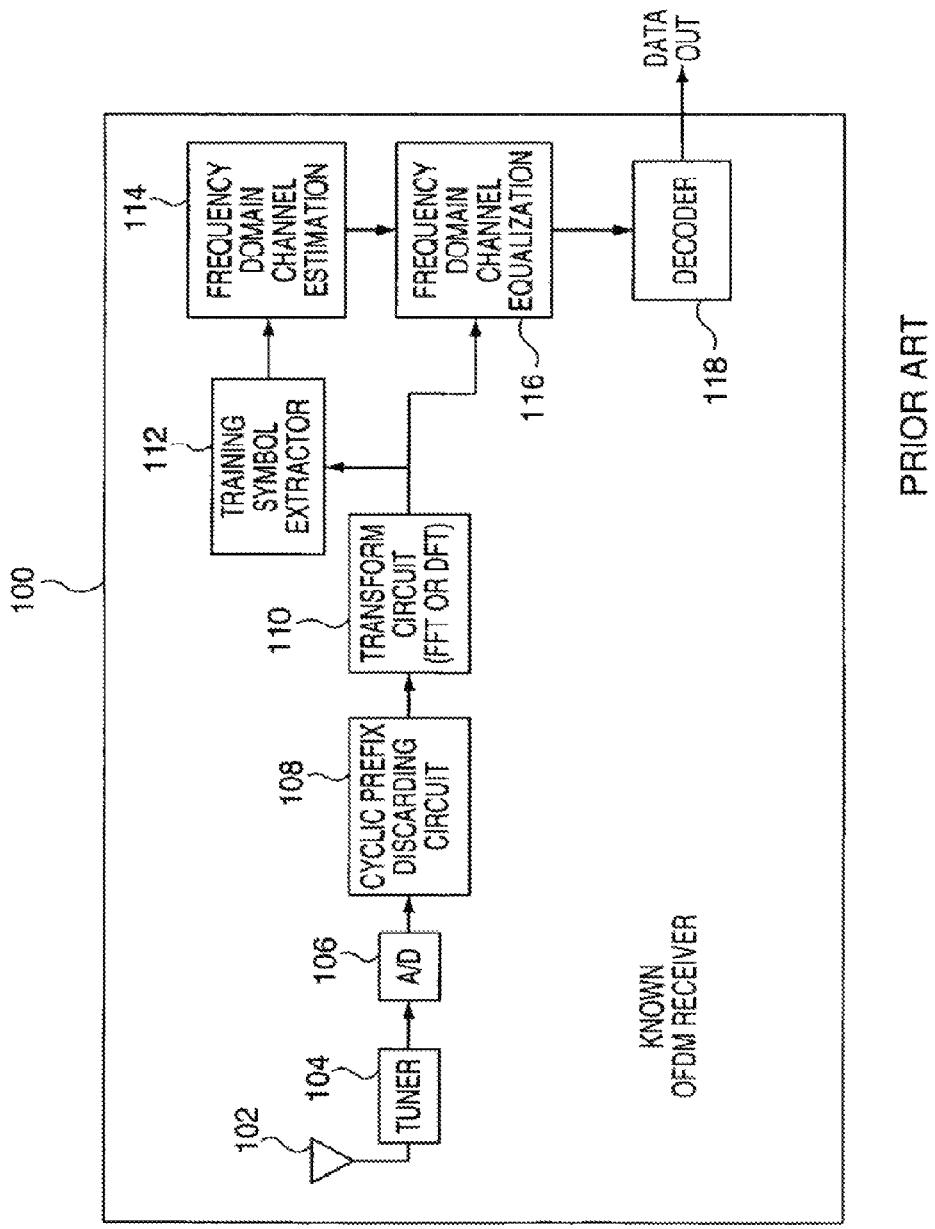
FIG. 1 is a block diagram of a known OFDM receiver.
Figure 9:
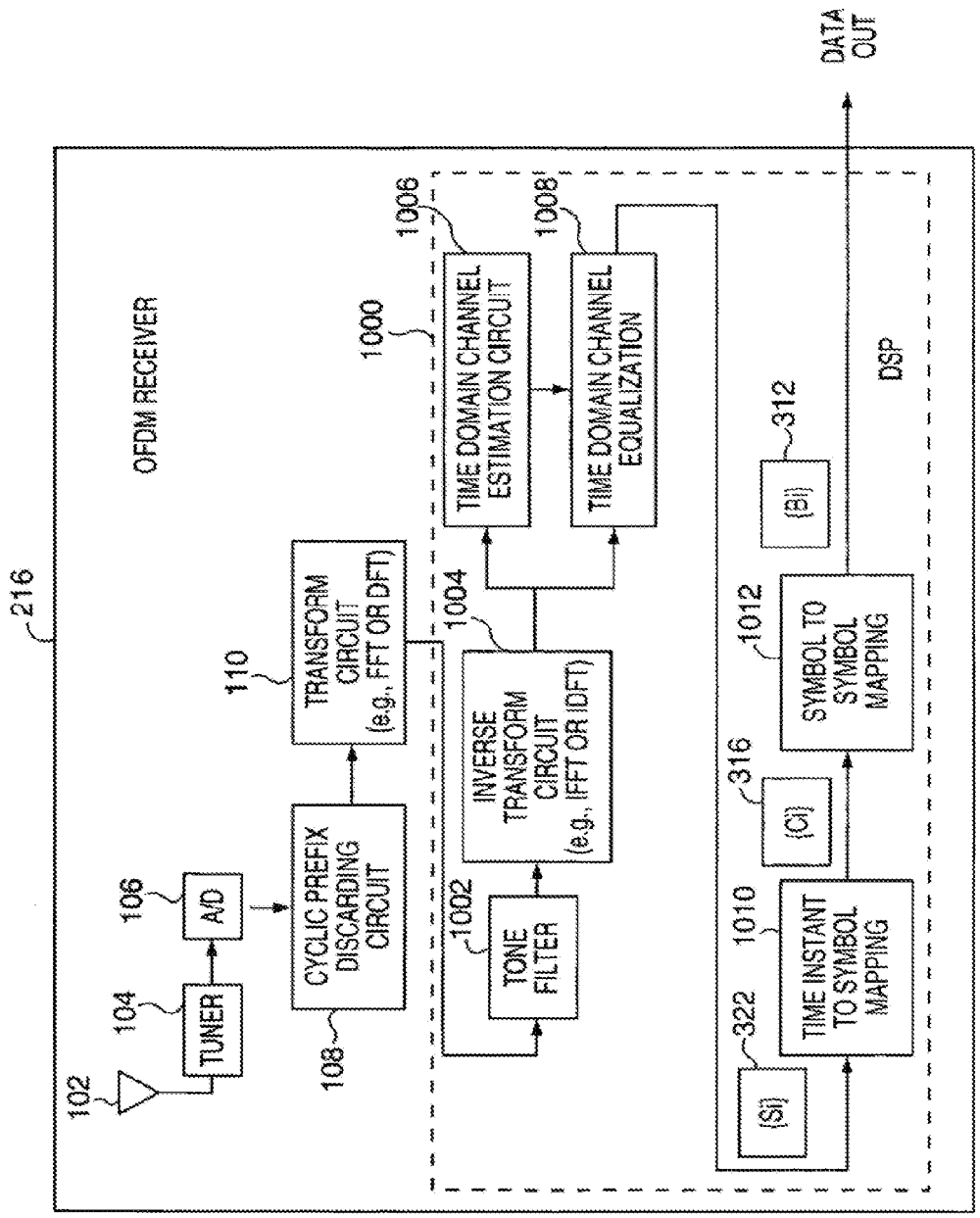
FIG. 9 illustrates an OFDM receiver of the present invention suitable for use in the communications system of FIG. 2.

FIG. 9 illustrates an OFDM receiver 216 implemented in accordance with the present invention which is designed to receive OFDM signals which were originally generated in the time domain, e.g., using one of the techniques described in U.S. patent application Ser. No. 09/805,887. Various elements of the receiver 216 which can be implemented using elements which are the same as, or similar to, elements of the known receiver 100 are identified in both FIGS. 1 and 9 using the same names and numbers.

The receiver 216 of the present invention includes an antenna 102, tuner 104, A/D converter 106, cyclic prefix discarding circuit 108, transform circuit 110 and a digital signal processor 1000.

Signals are received by antenna 102 and filtered by the tuner 104 to reduce and/or eliminate signals outside the set of frequencies used by the OFDM communications system 200. A/D converter 106 converts the analog filtered signal output by tuner 104 to a digital signal which is then supplied to circuit 108. Cyclic prefix discarding circuit 108 discards the cyclic prefix portion of the received signal leaving the signal portion corresponding to the transmitted symbols to be processed by transform circuit 110. Transform circuit 110 converters the time domain signal output by cyclic prefix discarding circuit 108 into a frequency domain signal by performing a frequency transform operation, e.g., a fast Fourier transform (FFT) or discrete Fourier transform (DFT) operation, thereon. Once transformed into the frequency domain, the signal is supplied to digital signal processor 1000 which is responsible for recovering the symbols transmitted by a user.

The DSP 1000 includes a plurality of modules and/or circuits for performing various signal processing functions. In accordance with the present invention, the circuits and/or modules may be implemented using dedicated hardware and/or software which controls a processor to perform the module's and/or circuit's functions.

The DSP 1000 includes a tone filter 1002, an inverse transform circuit 1004, time domain channel estimation circuit 1006, time domain channel equalization circuit 1008, time instant to symbol mapping module 1010 and a symbol to symbol mapping module 1012. Tone filter 1002 filters out tones corresponding to users other than the user of the receiver 216. Thus, the filter 1002 filters out tones used by the communication system which are not allocated to the particular user of the receiver 216. In this manner multiple access interference is removed.

Inverse transform circuit 1004 performs a frequency to time transform operation on the filtered signal by performing, e.g., an IFFT or IDFT operation, thereby generating a time domain signal. The generated time domain signal is supplied to the time domain channel estimation circuit 1006 and the time domain channel equalization circuit 1008.

The time domain channel estimation circuit 1006 extracts the training symbols from the time domain signal generated by transform circuit 1004 and performs channel estimation operations based on the difference between the received training symbol value in the time domain and the expected training symbol value. As discussed above, training symbols may be transmitted during each symbol transmission period. In such an embodiment, the channel function estimated based on the received training symbols is applied, or extrapolated and then applied, to the other symbols received in the same symbol period as the training symbols upon which a particular channel estimation is based.

In the case where training symbols are transmitted during one symbol transmission period of a dwell, time domain channel estimation circuit 1006 estimates the channel function for each of the symbol periods in the dwell based on the set of training symbols received during the training symbol period of the dwell.

The time domain channel estimation circuit 1006 may use one or more known techniques for estimating the channel function in the time domain based on the received training symbols. Since known techniques, based on a comparison of the received training symbol value and the expected training symbol value are employed, the particulars of the channel estimation techniques will not be discussed further.

In accordance with one embodiment of the present invention, a different channel estimation is made for each point in time of a symbol duration at which a symbol allocated to the user of the OFDM receiver is positioned. Accordingly, assuming the transmission of M symbols, M channel functions would be estimated in such an embodiment.

The channel function estimates generated by the time domain channel estimation circuit 1006 are supplied to the time domain channel equalization circuit 1008. The time domain channel equalization circuit 1008 performs a channel equalization operation using the channel estimate or estimates received from circuit 1006. In effect, time domain channel equalization circuit 1008 applies in the time domain a function that is the inverse of the estimated actual channel function. If the channel estimates are accurate, this will result in the elimination of distortions introduced into the transmitted signal by the communications channel. Assuming successful channel equalization, the output of the channel equalization circuit 1008 will be the original transmitted time domain signal including the set of points $\{S_i\}$ 322 transmitted to the receiver's user.

Alternatively, as mentioned above, the training symbols in the time domain can be used to train the channel equalization circuit 1008 directly without the first step of channel estimation. In one such embodiment channel estimation circuit 1006 is omitted from the receiver 216.

Time instant to symbol mapping circuit 1010 maps the signal values $\{S_i\}$ 322 at the evenly spaced points in time used to transmit the symbols in the time domain, back into the transmitted complex symbol values $\{C_i\}$ 316. Receiver circuit 1010 thereby performs the inverse of transmitter circuit 318.

The complex symbols $\{C_i\}$ output by time instant to symbol mapping circuit 1010 are supplied to the symbol to symbol mapping circuit 1012. The symbol mapping circuit 1012 maps the transmitted symbols $\{C_i\}$ corresponding to a second constellation of symbols back to the first constellation of symbols $\{B_i\}$. In this manner, circuit 1012 performs the inverse of transmitter symbol to symbol mapping circuit 314. Like the transmitter symbol mapping circuit 314, the receiver's symbol to symbol mapping circuit 1012 is optional and is not employed when the transmitter does not use symbol mapping circuit 314. The recovered complex symbols $\{B_i\}$ are output by the OFDM receiver circuit 216, e.g., for use by subsequent circuits.

Numerous variations to the above described methods and apparatus will be apparent in view of the above discussion. Such variations are to be considered within the scope of the described invention.

The invention claimed is:

1. A method of generating a frequency division multiplexed signal at a communications device for transmission in a wireless communication system, comprising:
   obtaining, by the communications device, one or more sets of M complex data symbols for transmission using a set of M tones allocated to the communications device for a dwell period comprising a plurality of symbol periods, wherein the set of M tones is a subset of tones in an available bandwidth;
   generating, by the communications device, one or more sets of M signal coefficients based at least in part on the one or more sets of M complex data symbols, wherein the one or more sets of M signal coefficients are mapped to the set of M tones for one or more symbol periods of the plurality of symbol periods of the dwell period, wherein generating the one or more sets of M signal coefficients comprises generating each of the one or more sets of M signal coefficients by performing a summation of a product of a set of M complex data symbols of the one or more sets of M complex data symbols and M complex sinusoids corresponding to the set of M tones;

mapping, by the communications device, at least one set of M training symbols to the set of M tones for at least one symbol period of the plurality of symbol periods of the dwell period;

processing, for each symbol period of the plurality of symbol periods of the dwell period, a corresponding set of M mapped symbols of the one or more sets of M signal coefficients and the at least one set of M training symbols to obtain the frequency division multiplexed signal for the each symbol period of the plurality of symbol periods of the dwell period; and transmitting, by the communications device, the frequency division multiplexed signal in the wireless communication system.

2. The method of claim 1, wherein processing the corresponding set of M mapped symbols for the each symbol period is performed according to a function that defines a continuous-time signal corresponding to the frequency division multiplexed signal for the each symbol period, and wherein the function comprises a summation of M sinusoids having coefficients corresponding to the set of M mapped symbols for the each symbol period.

3. The method of claim 1, further comprising:
prepending a cyclic prefix to the frequency division multiplexed signal.

4. The method of claim 1, wherein the at least one set of M training symbols comprises a set of predetermined symbol values.

5. The method of claim 1, wherein the at least one symbol period comprises a symbol period at or near the center of the dwell period.

6. The method of claim 1, wherein the set of M tones comprises M contiguous tones.

7. The method of claim 1, wherein the set of M tones comprises equally spaced tones.

8. A method of generating a frequency division multiplexed signal at a communications device for transmission in a wireless communication system, comprising:

determining, by the communications device, a first set of M tones allocated to the communications device for a first dwell period comprising a first plurality of symbol periods and a second, different set of M tones allocated to the communications device for transmission in a second dwell period comprising a second plurality of symbol periods, the first and second sets of M tones being a subset of tones in an available bandwidth;

generating, by the communications device, one or more sets of M data symbols for mapping to the first and second sets of M tones by performing a summation of a product of a set of M complex time domain data symbols and a set of M complex sinusoids corresponding to the first or second sets of M tones, respectively;

mapping, by the communications device, the one or more sets of M data symbols to the first set of M tones for one or more symbol periods of the first dwell period and to the second set of M tones for one or more symbol periods of the second dwell period;

processing, for each symbol period of the one or more symbol periods of the first and second dwell periods, a corresponding set of M mapped symbols to obtain the frequency division multiplexed signal for the each symbol period for the first and second dwell periods; and transmitting, by the communications device, the frequency division multiplexed signal in the wireless communication system.

9. The method of claim 8, wherein the second dwell period comprises a dwell period immediately following the first dwell period.

10. The method of claim 8, wherein processing the corresponding set of M mapped symbols for the each symbol period is performed according to a function that defines a continuous-time signal corresponding to the frequency division multiplexed signal for the each symbol period, and wherein the function comprises a summation of M sinusoids having coefficients corresponding to the set of M mapped symbols for the each symbol period.

11. The method of claim 8, further comprising:
prepending a cyclic prefix to the frequency division multiplexed signal.

12. The method of claim 8, wherein the first and second sets of M tones comprise M contiguous tones.

13. The method of claim 8, wherein the first and second sets of M tones comprise equally spaced tones.

14. An apparatus for generating a frequency division multiplexed signal at a communications device for transmission in a wireless communication system, comprising:

a time to frequency domain signal transformer for generating one or more sets of M signal coefficients for transmission using a set of M tones allocated to the communications device for a dwell period comprising a plurality of symbol periods, the one or more sets of M signal coefficients generated based at least in part on one or more sets of M complex data symbols obtained for transmission using the set of M tones in the dwell period, wherein the set of M tones is a subset of tones in an available bandwidth, wherein the one or more sets of M signal coefficients are mapped to the set of M tones for one or more symbol periods of the plurality of symbol periods of the dwell period, and wherein the time to frequency domain signal transformer generates each of the one or more sets of M signal coefficients by performing a summation of a product of a set of M complex data symbols of the one or more sets of M complex data symbols and M complex sinusoids corresponding to the M tones;

a mapper for mapping at least one set of M training symbols to the set of M tones for at least one symbol period of the plurality of symbol periods of the dwell period;

a frequency to time domain transformer for processing, for each symbol period of the plurality of symbol periods of the dwell period, a corresponding set of M mapped symbols of the one or more sets of M signal coefficients and the at least one set of M training symbols to obtain the frequency division multiplexed signal for the each symbol period of the plurality of symbol periods of the dwell period; and a transmitter for transmitting the frequency division multiplexed signal in the wireless communication system.

15. The apparatus of claim 14, wherein the frequency to time domain transformer processes the corresponding set of M mapped symbols according to a function that defines a continuous-time signal corresponding to the frequency division multiplexed signal for the each symbol period, and wherein the function comprises a summation of M sinusoids having coefficients corresponding to the set of M mapped symbols for the each symbol period.

16. The apparatus of claim 14, further comprising:
a cyclic prefix inserter for prepending a cyclic prefix to the frequency division multiplexed signal.

17. The apparatus of claim 14, wherein the at least one set of M training symbols comprises a set of predetermined symbol values.

18. The apparatus of claim 14, wherein the at least one symbol period comprises a symbol period at or near the center of the dwell period.

19. The apparatus of claim 14, wherein the set of M tones comprises M contiguous tones.

20. The apparatus of claim 14, wherein the set of M tones comprises equally spaced tones.

21. An apparatus for generating a frequency division multiplexed signal at a communications device for transmission in a wireless communication system, comprising:
- a time to frequency domain signal transformer for generating one or more sets of M data symbols for mapping to first and second sets of M tones by performing a summation of a product of a set of M complex time domain data symbols and a set of M complex sinusoids corresponding to the first or second sets of M tones, respectively;
- a mapping module for mapping the one or more sets of M data symbols to one or more symbol periods of a first dwell period and to one or more symbol periods of a second dwell period, the first dwell period comprising the first set of M tones allocated to the communications device for a first plurality of symbol periods, the second dwell period comprising the second set of M tones, wherein the second set of M tone are different than the first set and are allocated to the communications device for a second plurality of symbol periods;
- a frequency to time domain transformer for processing, for each symbol period of the one or more symbol periods of the first and second dwell periods, a corresponding set of M mapped symbols to obtain the frequency division multiplexed signal for the each symbol period for the first and second dwell periods; and
- a transmitter for transmitting the frequency division multiplexed signal in the wireless communication system.

22. The apparatus of claim 21, wherein the second dwell period comprises a dwell period immediately following the first dwell period.

23. The apparatus of claim 21, wherein the frequency to time domain transformer processes the corresponding set of M mapped symbols for the each symbol period according to a function that defines a continuous-time signal corresponding to the frequency division multiplexed signal for the each symbol period, and wherein the function comprises a summation of M sinusoids having coefficients corresponding to the set of M mapped symbols for the each symbol period.

24. The apparatus of claim 21, further comprising:
- a cyclic prefix inserter for prepending a cyclic prefix to the frequency division multiplexed signal.

25. The apparatus of claim 21, wherein the first and second sets of M tones comprise M contiguous tones.

26. The apparatus of claim 21, wherein the first and second sets of M tones comprise equally spaced tones.

* * * * *